United States Patent [19]

Schulz et al.

[11] Patent Number: 5,096,462
[45] Date of Patent: Mar. 17, 1992

[54] IGNITION PROMOTER, PROCESS FOR PREPARING SAME AND FUEL CONTAINING SAID IGNITION PROMOTER

[75] Inventors: Johann G. Schulz; Engelina Porowski, both of Pittsburgh, Pa.

[73] Assignee: J. G. S. Research Company, Inc., Pittsburgh, Pa.

[21] Appl. No.: 575,153

[22] Filed: Aug. 15, 1990

[51] Int. Cl.$^5$ ............................ C10L 1/02; C10L 1/22
[52] U.S. Cl. ............................................. 44/300; 44/313
[58] Field of Search ............ 44/280, 300, 605, 313, 44/606; 536/35, 38

[56] References Cited

U.S. PATENT DOCUMENTS

| | | | |
|---|---|---|---|
| 1,121,203 | 12/1914 | Rigby | 44/492 |
| 1,145,095 | 7/1915 | Testrup | 44/492 |
| 4,052,488 | 10/1977 | Schulz | 562/410 |
| 4,365,059 | 12/1982 | Baumann | 536/35 |
| 4,668,243 | 5/1987 | Schulz | 44/605 |

*Primary Examiner*—Margaret Medley
*Attorney, Agent, or Firm*—Joseph J. Carducci

[57] ABSTRACT

A novel ignition promoter; a process for preparing the ignition promoter which comprises removing cellulose from biomass, such as wood, bagasse, corncobs, straw, hay, or newspaper, and thereafter nitrating the remainder after treatment with an oxirane; and a fuel suitable for use in an internal combustion engine, such as a Diesel engine, containing an alcohol, such as methanol or ethanol, and said ignition promoter. Cellulose can be removed from the biomass by treating it with an aqueous nitric acid solution. The material remaining after cellulose removal can be nitrated using an aqueous solution of nitric acid. Nitration is carried out by reacting the material after cellulose removal with an oxirane, such as ethylene oxide, and thereafter nitrating the resulting product using aqueous nitric acid in combination with a dehydrating agent, such as sulfuric acid. The nitrated product is the novel ignition promoter and can be incorporated in the alcohol to produce an improved fuel suitable for use in an internal combustion engine.

21 Claims, No Drawings

IGNITION PROMOTER, PROCESS FOR PREPARING SAME AND FUEL CONTAINING SAID IGNITION PROMOTER

BACKGROUND OF THE INVENTION

1. Field of the Invention

This application relates to a novel ignition promoter; a process for preparing said ignition promoter which comprises removing cellulose from biomass and thereafter nitrating at least a portion of the remainder; and a fuel suitable for use in internal combustion engines containing an alcohol and said novel ignition promoter.

2. Description of the Prior Art

There is much interest in developing alternate fuels for internal combustion engines and the like, particularly for compression-ignition engines, for example Diesel engines, because of the high cost of fuels from petroleum, environmental reasons, etc. Among the materials that have received considerable attention, especially for Diesel engines, are the lower alcohols, such as methanol, ethanol, etc., particularly methanol, since it can easily be obtained from the large coal reserves available in many Western countries. Unfortunately, methanol or ethanol, alone, have low cetane numbers, 3 and 15, respectively, and therefore poor compression-ignition characteristics, making them unsuitable for use in Diesel engines. It is known that ignition improves can be added to lower alcohols to make them suitable for use in Diesel engines. We have discovered a novel composition, using a novel procedure for preparing the same, that can be incorporated into such alcohols as ignition promoters therefor to prepare novel fuels.

SUMMARY OF THE INVENTION

We have discovered (1) a novel composition of matter; (2) a novel process for preparing said novel composition of matter which comprises removing cellulose from biomass and thereafter nitrating at least a portion of the biomass remaining after such cellulose has been removed; and (3) a novel fuel suitable for use in an internal combustion engine containing a lower alcohol and said novel composition of matter as an ignition promoter therefor.

DESCRIPTION OF THE INVENTION

The material used to prepare the novel composition of matter defined and claimed herein is a biomass from which cellulose has been removed. In a preferred embodiment, a large amount of the cellulose in the biomass has been removed; in a most preferred embodiment, substantially all of the cellulose has been removed. The novel process defined and claimed herein is not dependent upon the manner in which the cellulose has been removed from the biomass, and therefore any known or suitable procedure can be used. By "biomass" we mean to include plant material produced by photosynthesis. Examples of biomass that can be used include wood, bagasse, corncobs, straw, hay, waste paper, etc.

Although we can use any biomass herein from which cellulose has been removed, we prefer to remove the same by treating the biomass involving the use of an aqueous solution of nitric acid under mild conditions of reaction. Thus, aqueous nitric acid having a nitric acid concentration of about 0.1 to about 70 weight percent, preferably from about 0.5 to about 30 weight percent, can be used. The mixture of biomass and aqueous nitric acid are maintained, for example, in intimate contact with each other at a temperature of about 20° to about 250° C., preferably about 50° to about 150° C., for about 0.1 to about 24 hours, preferably for about one to about five hours. Pressure is not important to the reaction, but when temperatures in excess of about 100° C. are used, the reaction will be carried out in a closed vessel.

At the end of the reaction period, the reaction mixture, which is in the form of a slurry, is treated in any known or suitable manner to remove the solid components (cellulose) therefrom. In a preferred embodiment, this is done by filtration or centrifugation. The primary reaction product in the aqueous solution so recovered is used in the nitration herein to obtain the novel composition of matter, that is, the novel ignition promoter. While we prefer to subject the biomass, after removal of cellulose therefrom, to nitration it is within the purview of our invention to use only a portion of the remainder. For example, biomass, such as wood, can be treated with an aqueous alcohol solution, such as a 65 weight percent aqueous ethanol solution, at an elevated temperature, such as about 195° C. The aqueous slurry obtained contains cellulose solids, which can be removed therefrom by filtration. The aqueous solution remaining can be cooled, for example to a temperature of about 25° C., whereby lignitic solids will precipitate and can be removed therefrom by filtration. The remaining portion of the biomass dissolved in said aqueous solution can also be nitrated herein. The nitration procedure can be carried out in any suitable or conventional manner, but we have obtained especially good results using two specific procedures therefor.

In one procedure, especially preferred, the primary reaction product obtained above is first subjected to reaction with an oxirane, for example, ethylene oxide or propylene oxide, preferably ethylene oxide. If desired, water is first removed, by any suitable manner, for example, by distillation, from the aqueous solution containing the primary reaction product, after cellulose removal. Since the primary reaction product is reacted with the oxirane while it is dissolved in a suitable polar solvent, for example, water, methanol, acetone, etc., it is preferred that water not be removed or only partially removed, from the aqueous solution after separation of cellulose but before reaction with the oxirane. In this procedure the chosen amount of oxirane is gradually added to the solution, for example, at ambient temperature and pressure. Heat generated by the reaction is controlled by cooling. After heat evolution ceases, the polar solvent in the reaction mixture is removed therefrom, for example, by distillation under reduced pressure. The resulting product is generally a viscous brown liquid, highly soluble in water. The weight ratio of primary product to oxirane used is generally in the range of about 1:10 to about 50:1, preferably about 1:1 to about 10:1. The weight ratio of polar solvent to primary product can range from about 1:20 to about 20:1, preferably about 1:10 to about 10:1. The reaction can be carried out over a period of about one minute to about 24 hours, preferably about one to about five hours at a temperature ranging from about 25° to about 300° C., preferably about 35° to about 250° C. Pressure can be at elevated levels, but ambient pressure is preferred.

The product defined above, obtained from the reaction of the primary product with an oxirane, is then subjected to nitration using nitric acid and a dehydrating agent, such as sulfuric acid, including oleum, anhydrous magnesium nitrate, acetic anhydride, etc. The aqueous nitric acid used in this step can have a concentration of about 70 to about 99.8 weight percent. The weight ratio of nitric acid to dehydrating agent, for example, 96 weight percent aqueous sulfuric acid, can be in the range of about 1:2 to about 2:1. The amount of nitric acid used relative to the material of substrate to be nitrated is that which is sufficient to introduce substantially the maximum amount of nitrogen into the substrate under conditions of reaction. For example, the weight ratio of nitric acid to substrate can be in the range of about 10:1 to about 1:10, preferably about 5:1 to about 1:5. The nitration can be carried out at a temperature in the range of about $-20°$ to about $35°$ C., preferably about $0°$ to about $25°$ C., over a period of about five minutes to about five hours, preferably about ten minutes to about two hours. Elevated pressures can be used, but ambient pressure is preferred. On termination of the reaction, the reaction mixture is poured on ice, resulting in the separation into an aqueous phase and a water-immiscible liquid product. The latter is repeatedly washed with water to remove residual acidity therefrom. The final product, the novel composition of matter defined and claimed herein, suitable for use as an ignition promoter, is a viscous, odorless, amber-colored liquid. The weight percent of nitrogen in this product can be, for example, in the range of about four to about 18, generally from about ten to about 14.

An alternate procedure for nitrating the primary reaction product remaining after treatment of biomass to remove cellulose therefrom to obtain the novel composition of matter defined and claimed herein involves subjecting the primary reaction product to treatment with nitric acid. In this procedure water is first removed from the aqueous mixture obtained after the defined treatment of biomass before reaction with nitric acid. The weight ratio of nitric acid used relative to the primary reaction substrate can be in the range of about 1:1 to about 10:1, preferably about 1.5:1 to about 6:1. The aqueous nitric acid used will have a concentration of about 70 to about 99.8. The reaction occurs at a temperature of about $-20°$ to about $35°$ C., preferably about $0°$ to about $25°$ C., over a period of about five minutes to about five hours, preferably about ten minutes to about two hours. Elevated pressures can be used, but ambient pressure is preferred. The reaction product obtained is poured onto ice, resulting in precipitation of yellow solids. The total diluted reaction product is subjected to evaporation at a reduced pressure, for example, 30 in. of mercury, for the removal of water and nitric acid therefrom, leaving behind a semisolid product, highly soluble in acetone and methanol. This is also the novel composition of matter defined and claimed herein. The weight percent of nitrogen in this product will be in the range of about three to about eight, generally about four to about five.

To obtain the novel fuel herein suitable for use in a compression-ignition engine (Diesel engine), the novel composition of matter defined herein is merely added to a lower alcohol having from one to about six carbon atoms, preferably from one to about four carbon atoms, or mixtures thereof, for example methanol or ethanol, in an amount such that the resulting fuel will contain, for example, from about 0.5 to about 30 weight percent, generally from about one to about ten weight percent, of the novel composition of matter (ignition promoter) defined herein.

The specific procedure used in nitrating the primary product obtained as a result of the treatment of biomass with nitric acid will have a great influence on the nitrated product (ignition promoter) used in preparing the novel fuel herein and the amount of the nitrated product to be used. For example, when the primary product is nitrated without any intermediate treatment, the nitrated product obtained will be a viscous, semi-solid containing about three to about eight weight percent nitrogen, generally from about four to about five weight percent nitrogen. When it is incorporated into a lower alcohol, particularly methanol, to obtain the novel fuel herein, care must be exercised to avoid formation of solid or semi-solid deposits in the event of evaporation of the alcohol in the fuel system, particularly the fuel injection system, during operation or upon engine shutdown. When the nitrated product obtained, however, using the indirect method with an oxirane, the nitrated product is a liquid having a low viscosity, remains liquid at $0°$ C., and has a nitrogen content of about four to about 18 weight percent, generally about ten to about 14 weight percent. Accordingly, less of this nitrated product will be needed to obtain a satisfactory fuel, because of its higher nitrogen content, and there will be less, or no tendency, to form solid deposits in the fuel system.

DESCRIPTION OF PREFERRED EMBODIMENTS

A number of runs was carried out illustrating the invention defined and claimed herein.

A slurry of 253 grams of Aspen pulp and 1700 grams of water was heated with mixing to $95°$ C. in a 10-liter round-bottom flask immersed into a water bath, after which 400 milliliters of 70 percent aqueous nitric acid then gradually added thereto over a period of one hour. The reaction mixture was maintained for an additional seven hours at $95°$ C., after which it was cooled to room temperature and filtered. The filtrate was evaporated in a rotary evaporator at a reduced pressure of about 30 inches of mercury, resulting in the recovery of 92 grams of light-yellow solids, which represent the intermediate product subjected to nitration herein to obtain the novel composition of matter. The filter cake (water-insoluble cellulose) was water washed and dried for a recovery of 105 grams. An additional run was similarly carried out. In these runs, as well as those following, the reaction was always carried out at atmospheric pressure, unless stated otherwise. The data obtained are set forth as Runs Nos. 1 and 2, respectively, in Table I below.

A slurry of 250 grams of ground corncobs and 1000 grams of water was heated with mixing to $95°$ C. using the apparatus and procedure described above. In this run 165 milliliters of 70 percent aqueous nitric acid were used with a total reaction time of two hours. 145 grams of water-soluble solids were recovered from the filtrate and 95 grams of cellulose. An additional run was similarly carried out. The data obtained are set forth below as Runs Nos. 3 and 4, respectively, in Table I below.

A slurry of 50 grams of ground corncobs and 200 grams of water was placed into a 750 milliliter stainless steel autoclave along with four milliliters of 70 percent aqueous nitric acid. The resulting slurry was then heated to $120°$ C. with mixing and kept at this temperature for 30 minutes. The reaction product was cooled to room temperature and then worked up as described in Run No. 1. There was recovered 26 grams of water-solublke solids along with 12.2 grams of a-cellulose. An additional two runs were similarly carried out. The data obtained are set forth below in Table I as Runs Nos. 5, 6, and 7, respectively.

A slurry of 25 grams of shredded newspapers and 400 grams of water was placed into a 750 milliliter stainless steel autoclave along with four milliliters of 70 percent aqueous nitric acid. The slurry was heated to 120° C. with mixing and kept at this temperature for 30 minutes. After cooling, 7.1 grams of a water soluble product was recovered along with 18.5 grams of cellulose. An additional two runs were carried out in similar fashion. The data obtained are set forth below as Runs Nos. 8, 9 and 10, respectively.

157 grams of liquid ethylene oxide were added to the flask over a period of two hours, resulting in strong evolution of heat. The temperature was kept at 50° C. throughout the runs by cooling it in a water bath until no further evolution of heat was observed. After standing overnight, water and unreacted ethylene oxide were removed from the reaction product in a rotary evaporator under a reduced pressure of about 30 inches of mercury. 459 grams of a viscous, brown liquid product were thereby recovered, representing a weight yield of 100 percent. The data obtained are summarized in Table II as Run No. 20.

TABLE 1

| Run No. | 1 | 2 | 3 | 4 | 5 | 6 | 7 | 8 | 9 | 10 |
|---|---|---|---|---|---|---|---|---|---|---|
| Feedstock | Aspen Pulp | Aspen Pulp | Corncobs | Corncobs | Corncobs | Corncobs | Corncobs | Newspaper | Newspaper | Newspaper |
| Biomass, Gms. | 253 | 25 | 250 | 250 | 50 | 500 | 50 | 25 | 300 | 25 |
| Water, Gms. | 1700 | 400 | 1000 | 1000 | 200 | 1250 | 200 | 400 | 1200 | 400 |
| $NHO_3$, Gms. (100%) | 400 | 8 | 165 | 20 | 4 | 300 | 32 | 4 | 198 | 8 |
| $HNO_3$ Conc, % | 18 | 2 | 13 | 2 | 2 | 17.4 | 13 | 1 | 13 | 2 |
| Reaction Time, Hrs. | 8 | 0.5 | 2 | 2 | 0.5 | 2 | 0.5 | 0.5 | 2 | 0.5 |
| Temp., °C. | 96 | 120 | 95 | 95 | 120 | 75 | 120 | 120 | 95 | 120 |
| $H_2O$ Sol. Prod., Gms. | 92 | 8.5 | 145 | 98 | 26 | 291 | 25.5 | 7.1 | 85 | 7.5 |
| $H_2O$ Sol. Prod., % | 36.4 | 34.3 | 58 | 39 | 52 | 58 | 51 | 28.4 | 29 | 30 |
| Cellulose, Gms. | 105 | 14.5 | 96 | Not available | 12.2 | 201 | 21.1 | 18.5 | 160 | 13 |

TABLE II

| Run No. | 11 | 12 | 13 | 14 | 15 | 16 | 17 | 18 | 19 | 20 |
|---|---|---|---|---|---|---|---|---|---|---|
| Primary Product, Gms. | 50 | 5 | 10 | 10 | 10 | 10 | 10 | 50 | 250 | 300 |
| Ethyene Oxide, Gms. | 12.5 | 10 | 15 | 10 | 10 | 10 | 5 | 25 | 131 | 157 |
| Ratio of Primary Product to Ethylene Oxide | 4 | 0.5 | 0.5 | 1 | 1 | 1 | 2 | 2 | 1.9 | 1.9 |
| Water, Gms. | 50 | 15 | 15 | 10 | 15 | 15 | 10 | 12.5 | 126 | 149 |
| Ratio of Water to Primary Prod. | 1 | 3 | 1.5 | 1 | 1.5 | 1.5 | 1 | 0.25 | 0.5 | 0.5 |
| Time, Hrs. | 18 | 1 | 1 | 1 | 1 | 18 | 1 | 18 | 18 | 1 |
| Derived Product, Gms. | 62 | 7.7 | 15.1 | 14.5 | 15.1 | 16.3 | 13.8 | 70 | 393.5 | 459 |
| Yield, % | 99.2 | 51.3 | 60.4 | 72.5 | 75.5 | 81.5 | 92 | 93.3 | 103.3 | 100.4 |

50 grams of water-soluble product obtained from treatment of newspaper following the procedure of Run No. 8 in Table I were dissolved in 50 grams of water and placed into a 500 milliliter round bottom flask equipped with a stirrer and thermometer. With vigorous stirring 12.5 grams of liquid ethylene oxide were added to the flask over a period of one hour, resulting in strong evolution of heat. The temperature was kept at 50° C. throughout the run by cooling in a water bath until no further evolution of heat was observed. After standing overnight, water and unreacted ethylene oxide were removed from the reaction product in a rotary evaporator under reduced pressure of about 30 inches of mercury. 62 grams of a viscous, brown liquid product were thereby recovered, representing a weight yield of 99.2 percent. An additional eight runs were similarly carried out. The data obtained are summarized in Table II as Runs 11 to 19, respectively.

300 grams of water-soluble product obtained from treatment of corncobs following the procedure of Run No. 3 in Table I were dissolved in 149 grams of water and placed into a one liter round bottom flask equipped with a stirrer and thermometer. With vigorous mixing 101 grams of the product obtained in Run No. 20 (reaction product of the primary product from newspaper with ethylene oxide) were gradually added over a period of 30 minutes to a mixture of 200 grams of 90 percent aqueous nitric acid and 350 grams of 96 percent aqueous sulfuric acid in a resin kettle cooled to 20° C. in a refrigerated bath. After an additional 30 minutes at 25° C. the reaction mixture was poured onto ice. The water-insoluble organic product was separated from the aqueous phase, repeatedly washed with water and then dried. The yield of dry product amounted to 133 grams for a weight yield of 131 percent. The nitrogen content of the nitrated product so obtained amounted to 14.28 weight percent. Additional runs were similarly carried out. The data obtained are summarized in Table III.

TABLE III

| Run No. | 21 | 22 | 23 | 24 | 25 | 26 | 27 |
|---|---|---|---|---|---|---|---|
| Product from Run No. 20, Gms. | 101 | 102 | 102 | 102 | 103 | 101 | 101 |
| $HNO_3$ | 200 | 200 | 200 | 200 | 200 | 200 | 200 |

TABLE III-continued

| Run No. | 21 | 22 | 23 | 24 | 25 | 26 | 27 |
|---|---|---|---|---|---|---|---|
| (90%) Gms. H$_2$SO$_4$ (97%) (Gms) | 350 | 350 | 350 | 350 | 300 | 300 | 350 |
| Temp., °C. | 25 | 25 | 10 | 15 | 1.5 | 1.5 | 1.75 |
| Time, Minutes | 30 | 80 | 65 | 30 | 15 | 15 | 20 |
| Water Insol. Prod., Gms | 133 | 130 | 131 | 130 | 128 | 142 | 131 |
| Yield, % | 131 | 127 | 129 | 127 | 125 | 140 | 130 |

Over a period of 10 minutes, 10 grams of primary product derived from Aspen pulp as in Run No. 1 were gradually added with mixing to 50 grams of 90 percent aqueous nitric acid placed in a flask immersed in a cooling bath kept at 0° C. After an additional two hours at 0° C. the liquid reaction product was poured into ice, resulting in the precipitation of yellow solids. The total diluted product was evaporated at a reduced pressure of 30 inches of mercury for removal of water and nitric acid therefrom, leaving behind 11.9 grams of the nitrated product, which is a semisolid material. This recovery was carried out in a thin-layer evaporator introducing periodically additional water in sufficient quantity to effect essentially complete removal of nitric acid. The product was highly soluble in methanol and acetone and showed a nitrogen content of 4.7 weight percent. Two additional runs were carried out using the product obtained by the procedures of Run Nos. 3 and 8, respectively. The data obtained are set forth below as Runs Nos. 28, 29 and 30, respectively, in Table IV.

TABLE IV

| Run No. | 28 | 29 | 30 |
|---|---|---|---|
| Organic Reactant, Gms. | 10 | 10 | 10 |
| HNO$_3$, 90%, Gms. | 50 | 20 | 20 |
| Reaction Time, Hrs. | 2 | 1 | 1 |
| Temperature, °C. | 0 | 0 | −5 |
| H$_2$O-Soluble Product, Gms. | 8.9 | 6 | 7 |
| H$_2$O-Insoluble Product, Gms. | 3 | 6.4 | 4.5 |
| Total Product, Gms. | 11.9 | 12.4 | 11.5 |
| Product Yield, % | 119 | 124 | 115 |

Run No. 31

Product obtained in Run No. 28 (ignition promoter) was dissolved in methanol in an amount to obtain a fuel having a concentration of 30 weight percent thereof. This fuel was tested in a one-cylinder version of a standard production Diesel engine Type, "OM 3520" and was found to perform smoothly and effectively therein.

Obviously, many modifications and variations of the invention, as hereinafter set forth, can be made without departing from the spirit and scope thereof, and therefore only such limitations should be imposed as are indicated in the appended claims.

I claim:

1. A process which comprises removing cellulose from a biomass using a conventional method therefor, reacting the remainder of said biomass with an oxirane and thereafter reacting the resulting reaction product under nitrating conditions with nitric acid therefor.

2. The process of claim 1 wherein said nitration is effected by subjecting said biomass after removal of cellulose therefrom to reaction with an oxirane at a temperature of about 25° to about 300° C. for about one minute to about 24 hours and then subjecting the resulting product to nitration with aqueous nitric acid having a concentration of about 70 to about 99.8 weight percent in combination with a dehydrating agent at a temperature of about −20° to about 35° C. for about five minutes to about five hours.

3. The process of claim 1 wherein said nitration is effected by subjecting said biomass after removal of cellulose therefrom to reaction with an oxirane at a temperature of about 35° to about 250° C. for about one to about five hours and then subjecting the resulting product to nitration with aqueous nitric acid having a concentration of about 70 to about 99.8 weight percent in combination with a dehydrating agent at a temperature of about 0° to about 25° C. for about ten minutes to about two hours.

4. The process of claim 2 wherein said oxirane is ethylene oxide and said dehydrating agent is sulfuric acid.

5. The process of claim 3 wherein said oxirane is ethylene oxide and said dehydrating agent is sulfuric acid.

6. The process of claim 1 wherein said biomass is selected from the group consisting of wood, corncobs, newspapers, bagasse and straw.

7. The composition of matter resulting from the process of claim 1.

8. The composition of matter resulting from the process of claim 2.

9. The composition of matter resulting from the process of claim 3.

10. The composition of matter resulting from the process of claim 4.

11. The composition of matter resulting from the process of claim 5.

12. The composition of matter resulting from the process of claim 6.

13. A novel fuel comprising a lower alcohol having from one to six carbon atoms or mixtures thereof containing from about 0.5 to about 30 weight percent of the composition of matter resulting from the process of claim 1.

14. The novel fuel of claim 13 wherein said alcohol has from one to four carbon atoms.

15. The novel fuel of claim 13 wherein said alcohol is selected from the group consisting of methanol and ethanol.

16. The novel fuel of claim 15 containing the composition of matter resulting from the process of claim 8.

17. The novel fuel of claim 15 containing the composition of matter resulting from the process of claim 9.

18. The novel fuel of claim 15 containing the composition of matter resulting from the process of claim 10.

19. The novel fuel of claim 15 containing the composition of matter resulting from the process of claim 11.

20. The novel fuel of claim 15 containing the composition of matter resulting from the process of claim 6.

21. The novel fuel of claim 15 wherein said fuel contains from about one to about 10 weight percent of said composition of matter.

* * * * *